(12) United States Patent
Choromanski et al.

(10) Patent No.: US 12,462,189 B2
(45) Date of Patent: Nov. 4, 2025

(54) ROBUST AND DATA-EFFICIENT BLACKBOX OPTIMIZATION

(71) Applicant: Google LLC, Mountain View, CA (US)

(72) Inventors: Krzysztof Choromanski, Lincroft, NJ (US); Vikas Sindhwani, Mt. Kisco, NY (US); Aldo Pacchiano Camacho, Berkeley, CA (US)

(*) Notice: Subject to any disclaimer, the term of this patent is extended or adjusted under 35 U.S.C. 154(b) by 1146 days.

(21) Appl. No.: 17/423,601

(22) PCT Filed: Dec. 16, 2019

(86) PCT No.: PCT/US2019/066547
§ 371 (c)(1),
(2) Date: Jul. 16, 2021

(87) PCT Pub. No.: WO2020/149971
PCT Pub. Date: Jul. 23, 2020

(65) Prior Publication Data
US 2022/0108215 A1     Apr. 7, 2022

Related U.S. Application Data

(60) Provisional application No. 62/793,248, filed on Jan. 16, 2019.

(51) Int. Cl.
*G06N 20/00* (2019.01)
*G06F 17/11* (2006.01)

(52) U.S. Cl.
CPC .............. *G06N 20/00* (2019.01); *G06F 17/11* (2013.01)

(58) Field of Classification Search
CPC ........ G06N 3/044; G06N 3/045; G06N 3/006; G06N 5/01; G06N 3/082; G06N 3/084; G06N 3/086
See application file for complete search history.

(56) References Cited

U.S. PATENT DOCUMENTS 10,482,392 B2    11/2019   Rendle et al.
2012/0317060 A1*  12/2012  Jebara ................... G06N 20/00
                                                    706/21
(Continued)

FOREIGN PATENT DOCUMENTS

CN    103780522    5/2014
CN    104616267    5/2015
(Continued)

OTHER PUBLICATIONS

Lehman et al. (ES is more than just a traditional finite-difference approximator, GECCO: Proceedings of the Genetic and Evolutionary Computation Conference, published 2018; pp. 1-8). (Year: 2018).*

(Continued)

*Primary Examiner* — Tan H Tran

(57) ABSTRACT

The present disclosure provides iterative blackbox optimization techniques that estimate the gradient of a function. According to an aspect of the present disclosure, a plurality of perturbations used at each iteration can be sampled from a non-orthogonal sampling distribution. As one example, in some implementations, perturbations that have been previously evaluated in previous iterations can be re-used at the current iteration, thereby conserving computing resources because the re-used perturbations do not need to be re-evaluated at the current iteration. In another example, in addition or alternatively to the use of previously evaluated perturbations, the perturbations evaluated at the current iteration can be sampled from a non-orthogonal sampling distribution.

20 Claims, 5 Drawing Sheets

(56) References Cited

U.S. PATENT DOCUMENTS

| | | | | |
|---|---|---|---|---|
| 2015/0331835 A1* | 11/2015 | Avron | ................... | G06N 20/10 |
| | | | | 702/179 |
| 2016/0003652 A1 | 1/2016 | Varun et al. | | |
| 2018/0149720 A1* | 5/2018 | Zhao | ................... | G01R 33/561 |
| 2018/0285759 A1* | 10/2018 | Wood | ................... | G06N 3/006 |
| 2019/0197244 A1* | 6/2019 | Fong | ................... | G06N 20/00 |
| 2020/0134506 A1* | 4/2020 | Wang | ................... | G06N 3/088 |
| 2020/0226496 A1* | 7/2020 | Basu | ................... | G06N 5/01 |
| 2021/0357740 A1* | 11/2021 | He | ................... | G06N 3/02 |
| 2022/0058175 A1* | 2/2022 | Sawada | ................... | G06N 5/01 |

FOREIGN PATENT DOCUMENTS

| | | |
|---|---|---|
| CN | 108257116 | 7/2018 |
| CN | 109165416 | 1/2019 |

OTHER PUBLICATIONS

Salimans et al. (Evolution Strategies as a Scalable Alternative to Reinforcement Learning, published 2017; pp. 1-13). (Year: 2017).*

Choromanski et al., "When Random Search is not Enough: Sample-Efficient and Noise-Robust Blackbox Optimization of RL Policies", arxiv.org, Cornell University Library, Mar. 7, 2019, XP081130675.

Chromoanski et al., "Provably Robust Blackbox Optimization for Reinforcement Learning", arxiv.org, Cornell University Library, Jul. 8, 2019, XP081436951.

Choromanski et al., "Structured Evolution with Compact Architectures for Scalable Policy Optimization", arxiv.org, Cornell University Library, Apr. 6, 2018, XP081236724.

Ghanberi et al., "Black Box Optimization in Machine Learning with Trust Region Based Derivative Free Algorithm", arxiv.org, Cornell University Ithaca, Mar. 20, 2017, XP080758401.

International Search Report for Application No. PCT/US2019/066547, mailed on Jun. 8, 2020, 2 pages.

Chinese Search Report Corresponding to Application No. 2019800887529 on Jan. 8, 2024.

Avron et al., "Sharper Bounds for Regression and Low-Rank Approximation with Regularization", arXiv:1611.03225v1, dated Nov. 10, 2016, 35 pages.

International Preliminary Report on Patentability for Application No. PCT/US2019/066547, mailed Jul. 29, 2021, 7 pages.

* cited by examiner

ROBUST AND DATA-EFFICIENT BLACKBOX OPTIMIZATION

RELATED APPLICATIONS

This application claims the right of priority under 35 U.S.C. § 371 to International Application No. PCT/US2019/066547 filed on Dec. 16, 2019, which claims priority to and the benefit of U.S. Provisional Patent Application No. 62/793,248 filed Jan. 16, 2019. Each of International Application No. PCT/US2019/066547 and U.S. Provisional Patent Application No. 62/793,248 is hereby incorporated by reference in its entirety.

FIELD

The present disclosure relates generally to derivative-free optimization, for example, in the context of machine-learning. More particularly, the present disclosure relates to blackbox optimization techniques that are robust and data-efficient.

BACKGROUND

A system (e.g., a machine-learned model) can include a number of adjustable parameters that affect the quality, performance, and/or outcome of the system. Identifying a specific set of parameter values that optimize the performance of the system (e.g., in general or for a particular application or user group) can be challenging, particularly when the system is complex (e.g., challenging to model) or includes a large number of adjustable parameters.

Any sufficiently complex system can be viewed as a blackbox when it becomes easier to experiment with than to understand. As such, for many systems such as, for example, hyperparameter tuning for machine learning systems, the current state of the art includes manual tuning/experimentation with the parameter values of the system, which is a time-consuming process that does not efficiently move towards an optimal set of parameter values. For example, in addition to inefficiently consuming human time, manual tuning can inefficiently consume computing resources such as memory space, processor usage, power consumption, etc. as the human tuning may require large amounts of tuning and testing that do not quickly progress to the optimal result and each instance of testing requires allocation/consumption of computing resources.

As various systems have become more complex, blackbox or derivative-free optimization (DFO) techniques have become increasingly popular alternatives. Blackbox optimization can include the task of optimizing an objective function with a limited budget for evaluations and without obtaining information directly describing a gradient of the objective function. For example, in some instances, the adjective "blackbox" can refer to the situation where the objective function can be evaluated for a given input, however other information about the function, such as the true gradient or Hessian of the function, is not generally known. When function evaluations are expensive, it is desirable to carefully and adaptively select values to evaluate. Thus, an overall goal of a blackbox optimization technique can be to generate a sequence of input values that approaches the global optimum as rapidly as possible and/or that consumes the least amount of computing resources in the process.

Interest in blackbox techniques such as "evolutionary strategies" has recently surged in the Reinforcement Learning (RL) community, with growing evidence that they match state of the art methods for policy optimization tasks. In particular, they are much simpler to implement, do not rely on the specific internal structure of the problem under consideration (and thus can be applied to general blackbox optimization problems), and often outperform other state-of-the-art methods. Blackbox techniques, however, can suffer from high sampling complexity since they require a substantial number of policy rollouts for reliable gradient estimates. They can also be very sensitive to noise in the rewards, actuators or the dynamics of the environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by one or more computing devices, data descriptive of current values of a plurality of parameters of a machine-learned model. The method includes, for at least one of one or more iterations: sampling, by the one or more computing devices, a plurality of perturbations to the current values of the plurality of parameters of the machine-learned model from a non-orthogonal sampling distribution. The method includes, for at least one of one or more iterations: determining, by the one or more computing devices, a plurality of performance values respectively for the plurality of perturbations, wherein the performance value for each perturbation is generated through evaluation, by a performance evaluation function, of a performance of the machine-learned model with the current values of its parameters perturbed according to the perturbation. The method includes, for at least one of one or more iterations: performing, by the one or more computing devices, a regression with respect to the plurality of perturbations and the plurality of performance values to estimate a gradient of the performance evaluation function. The method includes, for at least one of one or more iterations: modifying, by the one or more computing devices, the current value of at least one of the plurality of parameters of the machine-learned model based at least in part on the estimated gradient of the performance evaluation function. The method includes, after the one or more iterations, providing, by the one or more computing devices, final values of the plurality of parameters of the machine-learned model as an output.

The method may comprise the following features. The method may further comprise, for at least one of the one or more iterations: identifying, by the one or more computing devices, one or more previously evaluated perturbations that are included within a trust region associated with the current values of the plurality of parameters; and including, by the one or more computing devices, the one or more previously evaluated perturbations in the plurality of perturbations; wherein determining, by the one or more computing devices, the plurality of performance values respectively for the plurality of perturbations comprises re-using, by the one or more computing devices, one or more previously evaluated performance values respectively for the one or more previously evaluated perturbations. Identifying, by the one or more computing devices, the one or more previously evaluated perturbations that are included within the trust region may comprise identifying, by the one or more computing devices, any previously evaluated perturbations that are within a radius from the current values of the plurality of parameters. Identifying, by the one or more computing devices, the one or more previously evaluated perturbations that are included within the trust region may comprise identifying, by the one or more computing devices, a fixed fraction of previously evaluated perturbations that are closest to the current values of the plurality of parameters. Performing, by the one or more computing devices, the regression with respect to the plurality of perturbations and the plurality of performance values may comprise determining, by the one or more computing devices, a forward finite-difference evolution strategy estimator based on the plurality of perturbations and the plurality of performance values. Performing, by the one or more computing devices, the regression with respect to the plurality of perturbations and the plurality of performance values may comprise determining, by the one or more computing devices, an antithetic evolution strategy estimator based on the plurality of perturbations and the plurality of performance values. The machine-learned model may comprise a reinforcement learning policy and the performance evaluation function comprises a reward function that determines a reward for actions taken in accordance with the reinforcement learning policy. The machine-learned model may comprise a neural network. The parameters of the machine-learned model may comprise hyperparameters of the machine-learned model. The machine-learned model may comprise a structured network with weight sharing mechanisms. Performing, by the one or more computing devices, the regression with respect to the plurality of perturbations and the plurality of performance values may comprise performing, by the one or more computing devices, an under-constrained linear regression with respect to the plurality of perturbations and the plurality of performance values. Performing, by the one or more computing devices, the regression with respect to the plurality of perturbations and the plurality of performance values may comprise performing, by the one or more computing devices, an L1- or L2-regularized regression with respect to the plurality of perturbations and the plurality of performance values.

Another example aspect of the present disclosure is direct to a computing system. The computing system includes one or more processors and one or more non-transitory computer-readable media that collectively store instructions that, when executed by the one or more processors, cause the computing system to perform operations. The operations include obtaining, by one or more computing devices, data descriptive of current values of a plurality of parameters of a machine-learned model; and for at least one of one or more iterations: sampling, by the one or more computing devices, a plurality of perturbations to the current values of the plurality of parameters of the machine-learned model from a non-orthogonal sampling distribution; determining, by the one or more computing devices, a plurality of performance values respectively for the plurality of perturbations, wherein the performance value for each perturbation is generated through evaluation, by a performance evaluation function, of a performance of the machine-learned model with the current values of its parameters perturbed according to the perturbation; performing, by the one or more computing devices, a regression with respect to the plurality of perturbations and the plurality of performance values to estimate a gradient of the performance evaluation function; and modifying, by the one or more computing devices, the current value of at least one of the plurality of parameters of the machine-learned model based at least in part on the estimated gradient of the performance evaluation function; and after the one or more iterations, providing, by the one or more computing devices, final values of the plurality of parameters of the machine-learned model as an output. The system may also carry out operations according the method aspect described above.

Another example aspect of the present disclosure is directed to a computing system. The computing system includes one or more processors and one or more non-transitory computer-readable media that collectively store instructions that, when executed by the one or more processors, cause the computing system to perform operations. The operations include obtaining data descriptive of current values of a plurality of parameters of a machine-learned model. The operations include, for at least one iteration of one or more iterations: identifying one or more previously evaluated perturbations that are included within a trust region associated with the current values of the plurality of parameters. The operations include, for at least one iteration of one or more iterations: accessing one or more previously evaluated performance values respectively for the one or more previously evaluated perturbations that are included within the trust region. The operations include, for at least one iteration of one or more iterations: sampling a plurality of additional perturbations to the current values of the plurality of parameters of the machine-learned model from a sampling distribution. The operations include, for at least one iteration of one or more iterations: determining a plurality of additional performance values respectively for the plurality of additional perturbations, wherein the performance value for each additional perturbation is generated through evaluation, by a performance evaluation function, of a performance of the machine-learned model with the current values of its parameters perturbed according to the additional perturbation. The operations include, for at least one iteration of one or more iterations: performing a regression with respect to a first combination of the one or more previously evaluated perturbations with the plurality of perturbations and a second combination of the one or more previously evaluated performance values with the plurality of additional performance values to estimate a gradient of the performance evaluation function. The operations include, for at least one iteration of one or more iterations: modifying the current value of at least one of the plurality of parameters of the machine-learned model based at least in part on the estimated gradient of the performance evaluation function.

The system may comprise the following features. The sampling distribution may be orthogonal. Alternatively, the sampling distribution may be non-orthogonal. Identifying the one or more previously evaluated perturbations that are included within the trust region may comprise identifying any previously evaluated perturbations that are within a radius from the current values of the plurality of parameters. Identifying the one or more previously evaluated perturbations that are included within the trust region may comprise identifying a fixed fraction of previously evaluated perturbations that are closest to the current values of the plurality of parameters. Performing the regression may comprise determining a forward finite-difference evolution strategy estimator based on the first concatenation of the one or more previously evaluated perturbations with the plurality of perturbations and the second concatenation of the one or more previously evaluated performance values with the plurality of additional performance values. Performing the regression may comprise determining an antithetic evolution strategy estimator based on the first concatenation of the one or more previously evaluated perturbations with the plurality of perturbations and the second concatenation of the one or more previously evaluated performance values with the plurality of additional performance values.

Another example of the present disclosure is directed to a computer-implemented method. The method includes, obtaining data descriptive of current values of a plurality of parameters of a machine-learned model; and for at least one iteration of one or more iterations: identifying one or more previously evaluated perturbations that are included within a trust region associated with the current values of the plurality of parameters; accessing one or more previously evaluated performance values respectively for the one or more previously evaluated perturbations that are included within the trust region; sampling a plurality of additional perturbations to the current values of the plurality of parameters of the machine-learned model from a sampling distribution; determining a plurality of additional performance values respectively for the plurality of additional perturbations, wherein the performance value for each additional perturbation is generated through evaluation, by a performance evaluation function, of a performance of the machine-learned model with the current values of its parameters perturbed according to the additional perturbation; performing a regression with respect to a first combination of the one or more previously evaluated perturbations with the plurality of perturbations and a second combination of the one or more previously evaluated performance values with the plurality of additional performance values to estimate a gradient of the performance evaluation function; and modifying the current value of at least one of the plurality of parameters of the machine-learned model based at least in part on the estimated gradient of the performance evaluation function. The method may also include the operations of the system aspect described above.

Another example of the present disclosure is directed to one or more non-transitory computer-readable medium that collectively store operations that when executed by a computing system cause the computing system to perform any of the above method aspects.

Other aspects of the present disclosure are directed to various systems, apparatuses, non-transitory computer-readable media, user interfaces, and electronic devices.

It will be readily appreciated that aspects may be combined and that features described in the context of one aspect may be combined with features described in the context of another aspect. For example, features of one method aspect may be combined with features of another method aspect, likewise features of one system aspect may be combined with features of another system aspect. Features from a method aspect may be combined with features from a system aspect amongst other feature/aspect combinations.

The machine-learned model can be configured to receive any kind of digital data input and to generate any kind of prediction (e.g., score or classification) output based on the input. A few examples follow.

For example, if the inputs are images or features that have been extracted from images, the output generated by the machine-learned model for a given image may be scores for each of a set of object categories, with each score representing an estimated likelihood that the image contains an image of an object belonging to the category.

As another example, if the inputs to the machine-learned model are Internet resources (e.g., web pages), documents, or portions of documents or features extracted from Internet resources, documents, or portions of documents, the output generated by the machine-learned model for a given Internet resource, document, or portion of a document may be a score for each of a set of topics, with each score representing an estimated likelihood that the Internet resource, document, or document portion is about the topic.

As another example, if the inputs to the machine-learned model are features of a personalized recommendation for a user, e.g., features characterizing the context for the recommendation, e.g., features characterizing previous actions taken by the user, the output generated by the machine-learned model may be a score for each of a set of content items, with each score representing an estimated likelihood that the user will respond favorably to being recommended the content item.

As another example, if the input to the machine-learned model is text in one language, the output generated by the machine-learned model may be a score for each of a set of pieces of text in another language, with each score representing an estimated likelihood that the piece of text in the other language is a proper translation of the input text into the other language.

As another example, if the input to the machine-learned model is a spoken utterance, a sequence of spoken utterances, or features derived from one of the two, the output generated by the machine-learned model may be a score for each of a set of pieces of text, each score representing an estimated likelihood that the piece of text is the correct transcript for the utterance or sequence of utterances.

As another example, the machine-learned model can be part of an auto-completion system or part of a text processing system.

As another example, the machine-learned model can be part of a reinforcement learning system and can generate outputs used for selecting actions to be performed by an agent interacting with an environment. For example, the agent may be a robot interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these examples, the observations may include, for example, one or more of images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these examples, the actions may be control inputs to control the robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some examples, the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In another example, the simulated environment may be a video game and the agent may be a simulated user playing the video game.

The example applications described above are not exhaustive, and other applications for the machine-learned model generated as described in this written description may also be used.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
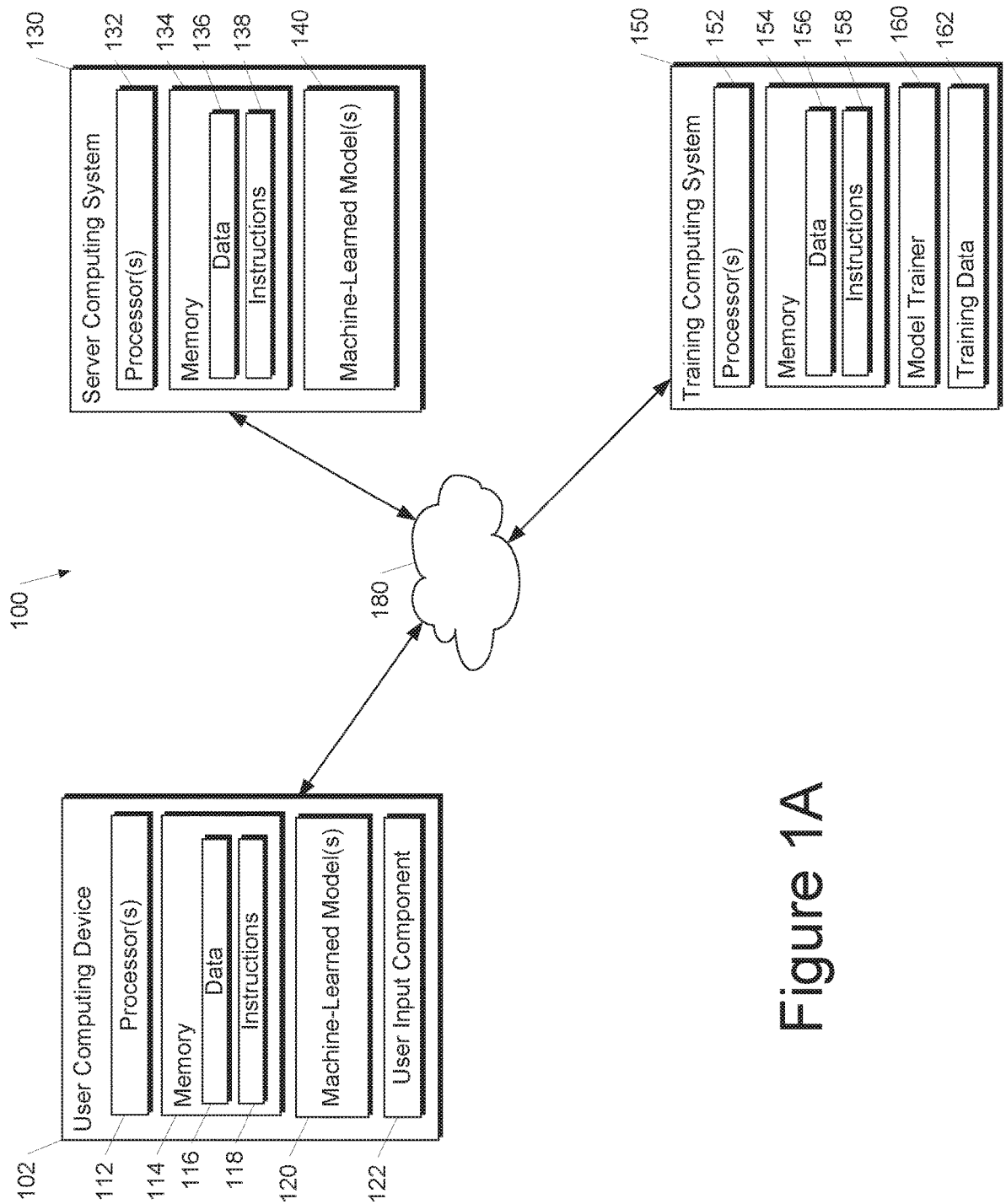
FIG. 1A depicts a block diagram of an example computing system according to example embodiments of the present disclosure.

Reference numerals that are repeated across plural figures are intended to identify the same features in various implementations.

DETAILED DESCRIPTION

1. Overview

Generally, the present disclosure is directed to iterative blackbox optimization techniques that estimate the gradient of a function that is representative of a system such as, for example, a machine-learned model. In particular, the optimization techniques described herein can include, at at least one of one or more iterations, performing a regression on a plurality of performance values respectively associated with a plurality of perturbations to a current set of values of a plurality of parameters of the system.

According to an aspect of the present disclosure, the plurality of perturbations used at each iteration can be sampled from a non-orthogonal sampling distribution. As one example, in some implementations, perturbations that have been previously evaluated in previous iterations can be re-used at the current iteration, thereby conserving computing resources because the re-used perturbations do not need to be re-evaluated at the current iteration. For example, in some implementations, previously evaluated perturbations can be re-used if they are included in a trust region associated with the current values of the plurality of parameters. In another example, in addition or alternatively to the use of previously evaluated perturbations, the perturbations evaluated at the current iteration can be sampled from a non-orthogonal sampling distribution, which is in contrast to various techniques (e.g., Monte Carlo techniques) which sample from an orthogonal distribution such as a Gaussian distribution. Use of perturbations sampled from a non-orthogonal sampling distribution as described herein enables more efficient optimization of the parameters because evaluations can be more efficiently allocated at each iteration.

The present disclosure provides a number of technical effects and benefits. As one example technical effect and benefit, the systems and methods of the present disclosure enable more efficient gradient recovery using generalized regression methods. In particular, through the use of a non-orthogonal sampling distribution, the perturbations used to estimate the gradient at each iteration can be more efficiently evaluated. For example, when previously evaluated perturbations from within a trust region are re-used, computing resources are directly conserved by eliminating the number of perturbations that must be evaluated at the current iteration. This saves computing resources such as processor time, memory usage, energy usage, network bandwidth, etc. that would be required to perform the evaluation. Further, even when previously evaluated perturbations are not re-used, selection of perturbations to be evaluated from a non-orthogonal sampling distribution still results in better learning curves, which corresponds to reduced training time. For example, use of a non-orthogonal sampling distribution can allow for conditional sampling which can intelligently use information from previous outcomes. This enables more information and/or better gradient estimates to be obtained at each iteration, speeding the training process and reducing the number of training iterations that are performed. By reducing the number of training iterations that are performed, computing resources can be saved because they are not required to be allocated to the additional training iterations.

As will be described further herein, the present disclosure also provides a combination of additional strategies to improve data efficiency of DFO-based policy optimization methods. As one example, example implementations of the present disclosure can use compact, structured policy networks with weight sharing (e.g. Toeplitz weight matrices) mechanisms to reduce problem dimensionality. Use of a compact, structured network may enable training of a policy network with a much smaller number of parameters. This network with smaller number of parameters can be faster to train, smaller to store, faster to run (e.g., less latency), and easier to transmit over a network, all of which save computing resources. Furthermore, a synergistic effect has been demonstrated between these structured networks and the optimization techniques described herein.

Additional strategies provided by the present disclosure that improve data efficiency include: use of L0/L1/L2 regularized regression-based gradient estimation to exploit sparsity and smoothness; gradient recovery via robust loss function (e.g., M-estimators such as L1, Huber, least trimmed loss) for handling stochastic and deterministic noise; use of analytical gradients from a global differentiable model updated incrementally; and/or use of sliding trust regions for efficient sample re-use.

U.S. Provisional Patent Application No. 62/793,248, which is fully incorporated herein, provides results for example experiments conducted on aspects of the present disclosure. For example, on several OpenAI Gym RL tasks, example experimental results demonstrate that with the data efficient proposals described herein, policies can be trained on just a single machine with performance that is competitive with prior work involving O(1000)-machine clusters. Furthermore, training is highly noise robust, tolerating as much as twenty percent arbitrary corruption of rollout measurements. This noise robustness is also backed by theoretical results.

Although portions of the discussion contained herein will focus on optimization of parameters of a machine-learned model (e.g., a neural network), the optimization techniques of the present disclosure are equally applicable to the optimization of the adjustable parameters of any system. As one example, the system can be an industrial process and the adjustable parameters can include inputs to and/or controls of the process (e.g., mix of materials, timing of various stages, temperature at various stages, etc.). In another example, the system can be a computing system and the adjustable parameters can include resource allocation parameters (e.g., cluster size, job allocation, job priority, etc.). Many different systems can be viewed as blackbox functions and the techniques described herein can be applied to any of such systems. Further, although portions the discussion contained herein will demonstrate use of the proposed optimization techniques in a reinforcement learning setting, the proposed techniques are not limited to this setting but instead can be applied to any setting where blackbox optimization is used.

More particularly, aspects of the present disclosure are applicable to the following example blackbox optimization problem:

$$\max_{\theta} F(\theta), \quad (1)$$

where $F: \Theta \to \mathbb{R}$ takes as input a sequence of parameters $\theta$ encoding a policy $\pi: \mathcal{S} \to \mathcal{A}$ ($\mathcal{S}$ and $\mathcal{A}$ standing for the space and action space respectively) and outputs the total (expected) reward R obtained by an agent applying this policy in a given environment. Since in some common instances the environment is a blackbox physics simulator, or even a piece of real hardware, F may only admit function evaluation and cannot be paired with explicit analytical gradients. Although this example reinforcement learning problem is discussed throughout the present disclosure, the techniques described herein is equally applicable to various other blackbox optimization problems, such as the optimization of adjustable parameters of any system.

Blackbox, or derivative-free, algorithms aim to maximize F by applying gradient-based approaches with various gradient estimation techniques. Among the most popular ones are random search methods that use randomized finite difference (FD) algorithms and can be equivalently thought of as Monte Carlo (MC) estimators of gradients of various smoothings of F or a form of Evolution Strategy (ES). Despite not relying on the internal structure of the reinforcement learning (RL) problem, these methods can be highly competitive with state of the art policy gradients methods, while admitting much simpler and highly parallelizable implementations.

However, in order to obtain an accurate estimator of the gradient of a high-dimensional policy $\pi$, a large number of long-horizon rollouts may be required, which quickly becomes a computational bottleneck. For instance, certain proposed ES algorithms require thousands of CPUs to get competitive results. Hence, improving data efficiency of such methods is the central motivation for the present disclosure.

Example aspects of the present disclosure provide and comprehensively benchmark example combinations of the following techniques. In one example, by sampling the function locally, the techniques described herein can recover the gradient via underconstrained linear regression wherein the sparsity and smoothness of unknown gradients can be exploited by L1 or L2 regularizers. In another example, noise coming from sources such as stochastic environment dynamics or rewards, or even deterministic error associated with Taylor approximation, can be handled via robust regression loss functions such as L1, Huber or Least trimmed loss. According to yet another aspect, example implementations of the present disclosure can use a sliding trust region to sample the blackbox function and re-use samples that overlap with previous iterates. This brings an off-policy flavor to blackbox methods. In addition, in conjunction with the ideas above, example implementations can use structured policy networks to bring the problem dimensionality into the DFO "sweetspot". Additional descriptions of structured policy networks are contained in U.S. Provisional Patent Application No. 62/793,248.

Example implementations of blackbox optimization algorithms using some or all of these strategies can be referred to as robust blackbox optimization, or: RBO. When a trust region technique is used enabling sample re-use, the further abbreviation of TR-RBO is used.

The approaches described herein fundamentally differ from the previous MC-based methods. In particular, example implementations of the present disclosure can reconstruct gradients by solving generalized regression/compressed sensing regularized optimization problems. The related computational overhead is negligible in comparison to time spent for querying blackbox function F, and the reconstruction is accurate also in a noisy measurement setting even if a significant amount (e.g., 20%) of total measurements of the interactions with the environment are arbitrarily inaccurate. Furthermore, substantially fewer rollouts are needed to learn these policies than standard blackbox methods. The proposed algorithms can easily be run in the distributed setting, where individual workers are conducting expensive environment rollouts in parallel and a central worker is solving an optimization problem to retrieve the gradient. However, since the number of required rollouts is drastically reduced, training can be conducted on a single machine.

The remainder of the present disclosure is organized as follows. Section 2 provides relevant background and introduces example RBO and TR-RBO algorithms. Section 3 gives convergence results for certain sub-classes of the proposed algorithms based on Linear Programming (LP) decoding techniques with strong noise robustness guarantees. Sections 4 and 5 provide example implementations of systems and methods according to aspects of the present disclosure. U.S. Provisional Patent Application No. 62/793, 248 provides an exhaustive empirical evaluation of the proposed methods and detailed comparison with state of the art blackbox optimization techniques based on MC gradient approximation on various OpenAI Gym tasks.

2. Example Blackbox Optimization Via Gradient Sensing for RL & RBO-Algorithm Throughout the present disclosure, the terms: Evolution Strategy (ES), Monte-Carlo (MC) gradient estimation, or randomized finite differences may be used interchangeably. These standard methods for gradient estimation are described first, and then example approaches of the present disclosure are proposed.

Example Baselines: Monte Carlo Estimators of Gradients of Smoothings

In order to optimize blackbox function $F: \mathbb{R}^d \to \mathbb{R}$, one can consider computing the approximate gradient of certain smoothings of F. The Gaussian smoothing of F is given as:

$$F_\sigma(\theta) = \mathbb{E}_{g \sim \mathcal{N}(0, I_d)}[F(\theta + \sigma g)] = (2\pi)^{-\frac{d}{2}} \int_{\mathbb{R}^d} F(\theta + \sigma g) e^{-\frac{\|g\|^2}{2}} dg \quad (2)$$

for a smoothing parameter $\sigma > 0$. The gradient of the Gaussian smoothing of F is given by the formula:

$$\nabla F_\sigma(\theta) = \frac{1}{\sigma} \mathbb{E}_{g \sim \mathcal{N}(0, I_d)}[F(\theta + \sigma g) g]. \quad (3)$$

That formula leads to the straightforward unbiased Monte Carlo (MC) estimator of $\nabla F_\sigma(\theta)$, which can be called vanilla ES gradient estimator given by:

$$\hat{\nabla}^V_{MC} F_\sigma(\theta) = \frac{1}{k\sigma} \sum_{i=1}^k F(\theta + \sigma g_i) g_i, \quad (4)$$

where each $g_i$ is sampled independently from $\mathcal{N}(0, I_d)$. The vectors $g_i$ can be referred to as the perturbation (or sampling) directions. This is the baseline estimator that random search ES methods for policy optimization rely on, in particular methods proposed in Salimans et al., 2017 ("Evolution strategies as a scalable alternative to reinforcement learning") and Mania et al., 2018 ("Simple random search provides a competitive approach to reinforcement learning").

Different variants of that baseline method, where other control variate terms (e.g., leading to estimators that are still unbiased) as well as sensing directions $g_i$ taken from other distributions (such as rows of random Hadamard matrices for which the corresponding estimators become biased) are proposed in U.S. Provisional Patent Application No. 62/793, 248. Here, some of the most prominent examples include: the so-called forward finite-difference ES gradient estimator given by:

$$\hat{\nabla}^{FD}_{MC} F_\sigma(\theta) = \frac{1}{k\sigma} \sum_{i=1}^k (F(\theta + \sigma g_i) - F(\theta)) g_i, \quad (5)$$

and an antithetic ES gradient estimator defined as:

$$\hat{\nabla}^{AT}_{MC} F_\sigma(\theta) = \frac{1}{2k\sigma} \sum_{i=1}^k (F(\theta + \sigma g_i) - F(\theta - \sigma g_i)) g_i, \quad (6)$$

Both different control variates (e.g., antithetic sampling) as well as different distributions for $g_i$ (e.g., those giving rise to quasi Monte Carlo estimators of $\nabla F_\sigma(\theta)$) lead to moderate accuracy gains (lower variance of the estimator), but even these methods require substantial number of sensing directions (e.g., substantial number of expensive rollouts) to be capable to learn good quality RL policies.

Example Discussion of RBO Algorithm

Assume that F is smooth. Let $w \in \mathbb{R}^d$ and $\|w\|_2 = 1$. Notice that the following holds:

$$\lim_{\sigma \to 0} \frac{F(\theta + \sigma w) - F(\theta)}{\sigma} = \nabla F(\theta)^T w \quad (7)$$

Thus for z with $\|z\| \ll 1$ the following is true:

$$F(\theta + z) - F(\theta) \approx \nabla F(\theta)^T z \quad (8)$$

The expression $F(\theta + z) - F(\theta)$ can be called the forward finite-difference estimation of the action of gradient on z. By the similar analysis as above, the antithetic finite-difference estimation of the action of gradient on z can be obtained:

$$\frac{F(\theta + z) - F(\theta - z)}{2} \approx \nabla F(\theta)^T z \quad (9)$$

With this characterization, the problem of finding an approximate gradient $\nabla F(\theta)$ can be formulated as a regression problem (the finite-difference estimation of the action of the gradient is demonstrated, but completely analogous analysis can be done for the antithetic one).

Given samples $\{F(\theta + z_i)\}_{i=1}^k$ (which in the RL setting correspond to rewards obtained by different perturbed versions of the policy encoded by $\theta$), formulate the regression problem by considering vectors $\{z_1, \ldots, z_k\}$ with regression values $F(\theta + z_i) - F(\theta)$ for $i = 1, \ldots, k$. In some implementations, this regression problem can be solved by solving the following minimization problem:

$$\hat{\nabla}_{RBO} F(\theta) = \underset{v \in \mathbb{R}^d}{\arg\min} \frac{1}{2k} \|y - Zv\|_p^p + \alpha \|v\|_q^q, \quad (10)$$

where p, q≥1, $Z \in \mathbb{R}^{k \times d}$ is the matrix with rows encoding sampling directions $z_i$ and sampled from some given multivariate distribution $\mathbb{P} \in \mathcal{P}(\mathbb{R}^d)$, vector $y \in \mathbb{R}^k$ consists of regression values (e.g., $y_i = F(\theta + z_i) - F(\theta)$ for $i=1, \ldots, k$) and $\alpha > 0$ is a regularization parameter.

Various known regression methods arise by instantiating the above optimization problems with different values of p, q and $\alpha$. In particular, p=q=2 leads to ridge regression algorithm, p=2, q=1 to Lasso method and p=1, $\alpha$=0 to LP decoding. However, these known regression methods have to date been limited to sampling directions sampled from an orthogonal distribution such as a Gaussian distribution. According to an aspect of the present disclosure, as opposed to standard MC methods described before, in the techniques described herein the sampling directions $z_i$ do not need to be taken from the Gaussian multivariate distribution and, in fact, they do not even need to be independent.

One example algorithm obtained in such a way, that we call an RBO (Robust Blackbox Optimization) algorithm is presented as Algorithm 1 below. At each step of the iteration the regularized regression problem can be solved to estimate the gradient. The estimate is then used to update policy parameters. Step 7 in the for-loop of the RBO algorithm can be conducted to make sure that the resulting parameter vector is in the domain of allowed parameter vectors Θ.

Algorithm 1: RBO Algorithm
Input: F: $\Theta \to \mathbb{R}$ scaling parameter sequence $\{\delta_t\}_t$, initial $\theta_0 = u_0 \in \Theta$, number of perturbations k, step size sequence $\{\eta_t\}_t$, sampling distribution $\mathbb{P} \in \mathcal{P}(\mathbb{R}^d)$, parameters p, q, $\alpha$, number of iterations T.
Output: Vector of parameters $\theta_T$.
for t=0, 1, . . . , T−1 do
  1. Sample $g_1^{(t)}, \ldots, g_k^{(t)}$ from $\mathbb{P}$.
  2. Compute $F(\theta_t)$ and $F(\theta_t + \delta_t g_j^{(t)})$ for all j.
  3. Let $Z_t \in \mathbb{R}^{k \times d}$ be a matrix having rows equal to the vectors $\delta_t \times g_j^{(t)}$.
  4. Let $y_t \in \mathbb{R}^k$ be a vector having entries equal to $F(\theta_t + \delta_t g_j^{(t)}) - F(\theta_t)$.
  5. Let $\hat{\nabla}_{RBO} F(\theta)$ be the resulting vector after solving the following optimization problem:

$$\hat{\nabla}_{RBO} F(\theta) = \underset{v \in \mathbb{R}^d}{\arg\min} \frac{1}{2k} \|y_t - Z_t v\|_p^p + \alpha \|v\|_q^q,$$

6. Take $u_{t+1} = u_t + \eta_t \hat{\nabla}_{RBO} F(\theta)$
  7. Take $\theta_{t+1} = \arg\max_{\theta \in \Theta} \langle \theta, u_{t+1} \rangle - \frac{1}{2}\|\theta\|_2^2$.

Example Discussion of TR-RBO Algorithm

One main advantage of the above-described regression-based optimization algorithms for blackbox function gradient approximation is that it is not necessary to sample from a fixed distribution at each step in order to apply them. Instead, at any vector θ encoding the current policy, a good quality estimator of the corresponding gradient can be deduced from the blackbox function at any parameter point cloud around it.

Additional aspects of the present disclosure apply a trust region approach, where perturbations can be re-used from iteration to iteration. Reusing samples reduces sampling complexity since it reduces the number of times the blackbox function F is being called.

The present disclosure proposes two example trust region techniques for sample re-use and shows that they work very well in practice (see: U.S. Provisional Patent Application No. 62/793,248). The present disclosure is not limited to the two example trust region approaches described below.

Denote by $\theta_{t+1}$ current parameter vector obtained throughout the optimization process. In a first example strategy, called static trust region method, all perturbed policies of the form $\theta_t + \delta_t g_j^t$ for $j=1, \ldots, k$ that are within radius R from $\theta_{t+1}$ are re-used to approximate gradient of F in $\theta_{t+1}$ (where R is a tuned and/or adaptive hyperparameter).

In a second example strategy referred to as dynamic trust region method, only a fixed fraction τ (where τ is another hyperparameter) of policies of the form $\theta_t + \delta_t g_i^t$ that are closest to $\theta_{t+1}$ are re-used. Obtained in such a way, one example trust region method based modification of the RBO algorithm, called TR-RBO algorithm is presented in the Algorithm 2 below.

Algorithm 2: TR-RBO: Dynamic Trust Region
Input: F: $\Theta \to \mathbb{R}$, scaling parameter sequence $\{\delta_t\}_t$, initial $\theta_0 = u_0 \in \Theta$, number of perturbations k, step size sequence $\{\eta_t\}_t$, sampling distribution $\mathbb{P} \in \mathcal{P}(\mathbb{R}^d)$, parameters p, q, $\alpha$, τ, number of iterations T.
Output: Vector of parameters $\theta_T$.
1. Initialize $\Theta_{old}^{pert} = \emptyset$, $R_{old} = \emptyset$ ($|\Theta_{old}^{pert}| = |R_{old}|$).
for t=0, 1, . . . , T−1 do
  1. Compute all distances from $u_t$ to $\theta_{old}^{pert} \in \Theta_{old}^{pert}$.
  2. Find the closest τ-percentage of vectors from $\Theta_{old}^{pert}$ and call it $\Theta_\tau^{near}$. Call the corresponding subset of $R_{old}$ as $R_\tau^{near}$.
  3. Sample $g_1^{(t)}, \ldots, g_{k-|\Theta_\tau^{near}|}$ from $\mathbb{P}$.
  4. Compute $F(\theta_t)$ and $F(\theta_t + \delta_t g_j^{(t)})$ for all j.
  5. Let $Z_t \in \mathbb{R}^{k \times d}$ be a matrix obtained by concatenating rows given by $\delta_t \times g_i^{(t)}$ and those of the form: $p_i - \theta_t$, where $p_i \in R_\tau^{near}$.
  6. Let $y_t \in \mathbb{R}^k$ be the vector obtained by concatenating values $F(\theta_t + \delta_t g_j^{(t)}) - F(\theta_t)$ with those of the form: $r_i - F(\theta_t)$, where $r_i \in R_\tau^{near}$.
  7. Let $\hat{\nabla}_{RBO} F(\theta_t)$ be the resulting vector after solving the following optimization problem:

$$\hat{\nabla}_{RBO} F(\theta_t) = \underset{v \in \mathbb{R}^d}{\arg\min} \frac{1}{2k} \|y_t - Z_t v\|_p^p + \alpha \|v\|_q^q,$$

8. Take $u_{t+1} = \theta_t + \eta_t \hat{\nabla}_{RBO} F(\theta_t)$
  9. Take $\theta_{t+1} = \arg\max_{\theta \in \Theta} \langle \theta, u_{t+1} \rangle - \frac{1}{2}\|\theta\|_2^2$.
  10. Update $\Theta_{old}^{pert}$ to be the set of the form $\theta_t + z_i$, where $z_i$s are rows of $Z_t$ and $\theta_t$, and $R_{old}$ to be the set of the corresponding values $F(\theta_t + z_i)$ and $F(\theta_t)$.

Example Discussion of RBO Algorithm versus Monte Carlo Methods

The class of RBO algorithms contains as very special cases some of the most efficient Monte Carlo methods for blackbox function gradient estimation proposed in U.S. Provisional Patent Application No. 62/793,248 and based on random orthogonal sensing directions $g_i^{ort}$. There are many different ways of constructing orthogonal samples. Consider for instance a Gaussian matrix $G \in \mathbb{R}^{k \times d}$ with entries taken independently at random from $\mathcal{N}(0,1)$ (we will assume here that $k \leq d$). Perturbations $g_i^{ort}$ can be constructed by conducting Gram-Schmidt orthogonalization of G in order to get an orthonormal matrix $G_{ort}$ and then independently renormalizing rows so that the distribution of their lengths matches the distribution of the lengths of d-dimensional Gaussian vectors or so that the length of each row is equal to $\sqrt{d}$.

Another construction is based on the products of the so-called random Hadamard matrices HD, where H is a Kronecker-product Hadamard matrix and D is a random diagonal matrix with entries taken independently at random from {−1, +1}. The following is true (a completely analogous statement can be obtained for the antithetic case):

Lemma 1 The class of ES algorithms applying Monte Carlo based forward finite-difference estimators with k=d orthogonal sensing directions $g_i^{ort}$ of fixed deterministic length equal to $\sqrt{d}$ is equivalent to particular sub-classes of RBO algorithms with p=q=2 as well as with p=1 and α=0 (using forward finite-difference estimation of the action of the gradient and the same samples).

Proof Consider first the case p=q=2 (ridge regression for gradient approximation). The solution to the ridge regression problem:

$$\arg\min_{v \in \mathbb{R}^d} \frac{1}{2d} \|y_t - Z_t v\|_2^2 + \alpha \|v\|_2^2 \tag{11}$$

is of the form $$\hat{\nabla}_{RBO} F_{ridge}(\theta) = (Z_t^T Z_t + 2d\alpha I_d)^{-1} Z_t^T y_t \tag{12}$$

Notice that from the assumptions of the lemma we get: $Z_t Z_t^T = \delta^2 d I_d$. Therefore we have: $Z_t^T = \delta^2 d Z_t^{-1}$, thus we obtain:

$$\hat{\nabla}_{RBO} F_{ridge}(\theta) = \frac{1}{d\delta} G_{ort}^T y_t \cdot \frac{\delta^2}{\delta^2 + 2\alpha}, \tag{13}$$

where $G_{ort}^T$ is a matrix with rows given by $g_i^{ort}$. Thus if we take $\delta = \sigma_{MC}$, where $\sigma_{MC}$ stands for the smoothing parameter in the MS estimator and furthermore, $$\eta = \eta_{MC} \frac{\delta^2 + 2\alpha}{\delta^2},$$

where $\eta_{MC}$ stands for the steps size in the algorithm using that MC estimator, then RBO Algorithm is equivalent to that one and the proof is completed. Now consider the case: p=1, α=0. But then (since k=d) $\hat{\nabla}_{RBO} F_{ridge}(\theta)$ is a solution to the linear system and is of the form:

$$\hat{\nabla}_{RBO} F_{ridge}(\theta) = Z_t^{-1} v = \frac{1}{d\delta} G_{ort}^T y_t \cdot \frac{1}{\delta} \tag{14}$$

and we proceed as before, but this time with $\eta = \theta_{MC} \delta$.

The class of the RBO algorithms contains as special cases MC methods for blackbox optimization based on the orthogonal sensing, but in the next section and in U.S. Provisional Patent Application No. 62/793,248 it is shown that techniques which use non-orthogonal sampling outperform those that rely on orthogonal sampling. As examples, the (TR)-RBO algorithms using p=q=2, p=2, q=1 or p=1, α=0 will be capable of learning good quality policies for k<<d (see: U.S. Provisional Patent Application No. 62/793, 248). Furthermore (as is proven theoretically in the next section and confirmed experimentally in U.S. Provisional Patent Application No. 62/793,248), in the noisy regime setting, where lots of measurements are corrupted arbitrarily, RBO algorithms still work well as opposed to MC-based methods.

3. Example Convergence Results for Robust Gradient Recovery

This section provides example results for the convergence of the sub-class of RBO algorithms with p=1 and α=0 (i.e. using LP decoding to reconstruct the gradient of the blackbox function F) in the noisy measurements setting. All proofs are given in U.S. Provisional Patent Application No. 62/793,248. We will need certain smoothness assumptions about F, but as seen in U.S. Provisional Patent Application No. 62/793,248, those are actually not required and other sub-classes of (TR)-RBO algorithms are also capable of learning good policies.

The following definitions are used.

Definition 1 (coefficient p*) Let X~N (0,1) and denote: Y=|X|. Let f be the pdf of Y and F be its cdf function. Define $g(x) = \int_x^\infty y f(y) dy$. Function g is continuous and decreasing in the interval [0, ∞] and furthermore $g(0) = \mathbb{E}[Y]$. Since $\lim_{x \to \infty} g(x) = 0$, there exists x* such that $$g(x^*) = \frac{\mathbb{E}[Y]}{2}.$$

We define ρ* as:

$$\rho^* = 1 - F^{-1}(x^*) \tag{15}$$

It can be numerically evaluated that ρ*=0.239031891449516803895 . . . .

Definition 2 (λ-smoothness) A differentiable concave function F: $\Theta \to \mathbb{R}$ is smooth with parameter λ>0 if for every pair of points x, y∈ Θ:

$$\|\nabla F(y) - \nabla F(x)\|_2 \leq \lambda \|y - x\|_2$$

If F is twice differentiable it is equivalent to $-\lambda I \preccurlyeq \nabla^2 F(x) \preccurlyeq 0$ for all x∈ Θ.

Definition 3 (L-Lipschitz) We say that F: $\Theta \to \mathbb{R}$ is Lipschitz with parameter L>0 if for all x, y∈ Θ it satisfies $|F(x) - F(y)| \leq L \|x - y\|_2$.

We are ready to state our main theoretical result.

Theorem 1 Consider a blackbox function F: $\Theta \to \mathbb{R}$. Assume that F is concave, Lipschitz with parameter L and smooth with smoothness parameter λ. Assume furthermore that domain $\Theta \subset \mathbb{R}^d$ is convex and has $l_2$ diameter $\mathcal{B} < \infty$. Consider Algorithm 1 with p=1, α=0, τ=0, $$\delta_T \leq \frac{L}{d\lambda\sqrt{t+1}}, \eta_t = \frac{B}{L\sqrt{t+1}}$$

and the noisy setting in which at each step a fraction of at most ρ* of all measurements $F(\theta_t + \delta_t g_j^t)$ are arbitrarily corrupted for j=1, 2, . . . , k. There exists a universal constant $c_1 > 0$ such that for any $\gamma \in (0,1)$ and $T \leq \gamma \exp(c_1 d)$, the following holds with probability at least 1−γ:

$$F(\theta^*) - \left[\frac{1}{T}\sum_{t=0}^{T-1} F(\theta_t)\right] \leq \frac{13}{2}\mathcal{B} L \frac{1}{\sqrt{T}},$$

where $\theta^* = \arg\max_{\theta \in \Theta} F(\theta)$.

If F presents extra curvature properties such as being strongly concave, we can get a linear convergence rate.

Definition 4 (Strong concavity) A function F: $\Theta \to \mathbb{R}$ is strongly concave with parameter $\mu$ if:

$$F(y) \leq F(x) + \langle \nabla F(x), y-x \rangle - \frac{\mu}{2}\|y-x\|_2^2$$

The following theorem holds:

Theorem 2 Assume conditions from Theorem 1 and furthermore that F is strongly concave with parameter $\mu$. Take Algorithm 2.2 with p=1, $\alpha$=0, $\tau$=0, $$\delta_t \leq \frac{L^2}{d\mathcal{B}\mu\lambda(t+1)}, \eta_t = \frac{1}{\mu(t+1)}$$

acting in the noisy environment in which at each step a fraction of at most $\rho^*$ of all measurements $F(\theta_t + \delta_t g_j^t)$ are arbitrarily corrupted for j=1, 2, . . . , k. There exists a universal constant $c_1$>0 such that for any $\gamma \in (0,1)$ and $T \leq \gamma \exp(c_1 d)$, the following holds with probability at least $1-\gamma$:

$$F(\theta^*) - \left[\frac{1}{T}\sum_{t=0}^{T-1} F(\theta_t)\right] \leq \frac{6L^2}{\mu} \frac{(1+\log(T))}{T}$$

4. Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, a worker computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks), decision-tree based models (e.g., random forests), learned agent policies (e.g., policy networks), or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks (e.g., deep neural networks), decision-tree based models (e.g., random forests), learned agent policies (e.g., policy networks), or other types of machine-learned models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, reinforcement learning strategies. For example, the model trainer 160 can implement the blackbox optimization techniques described herein to train the models 120 and/140 (e.g., to optimize the parameters of the models).

Alternatively, the model trainer 160 can also perform other learning techniques such as supervised learning, unsupervised learning, and/or semi-supervised learning. These techniques can include performing gradient based optimization techniques such as backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In some implementations, the model trainer 160 can train the machine-learned models 120 and/or 140 based on a set of training data 162. The training data 162 can include, for example, an environment in which a model can choose to take certain actions which have certain outcomes. In other examples, the training data 162 can include labeled training examples.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
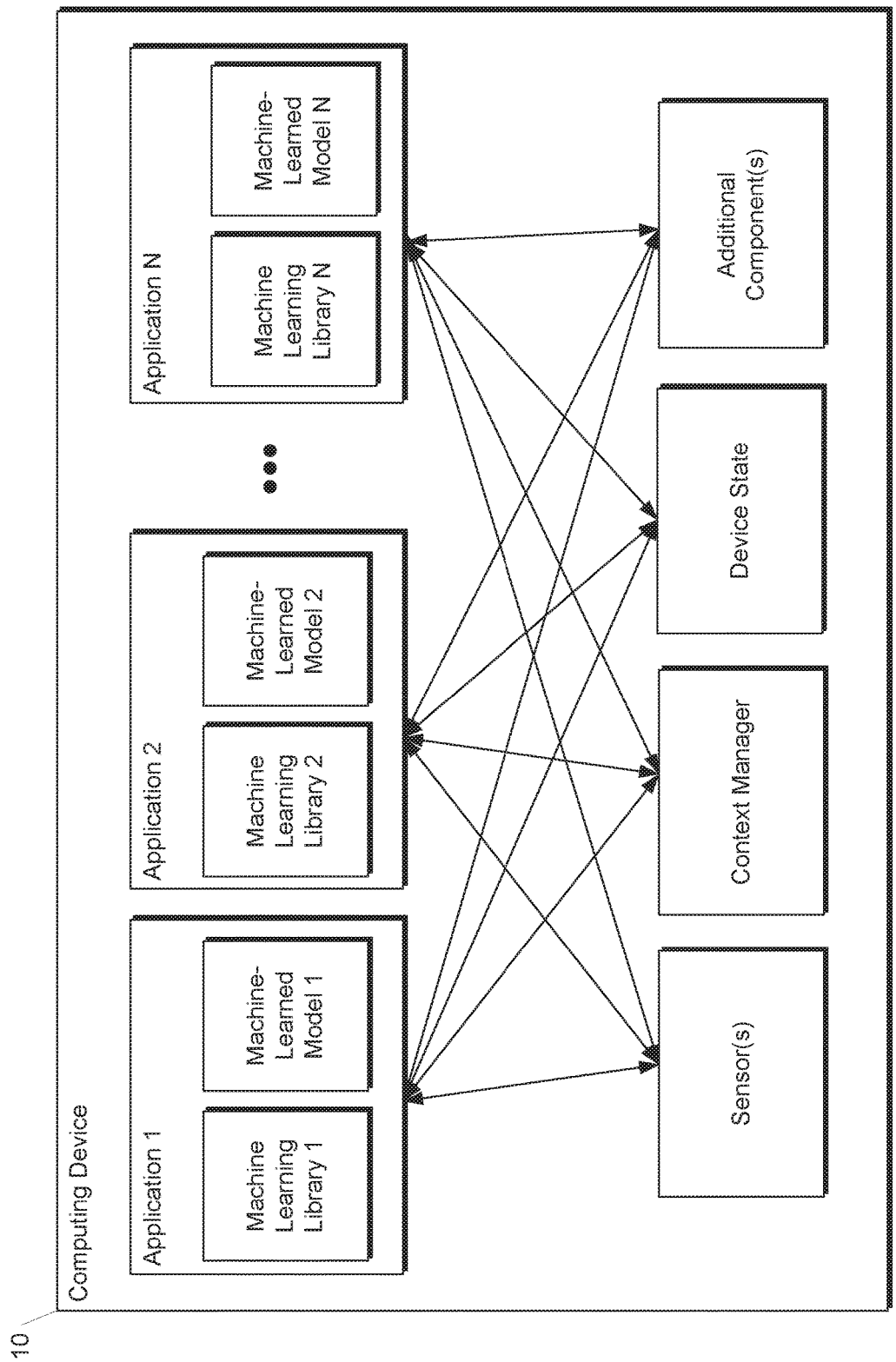
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
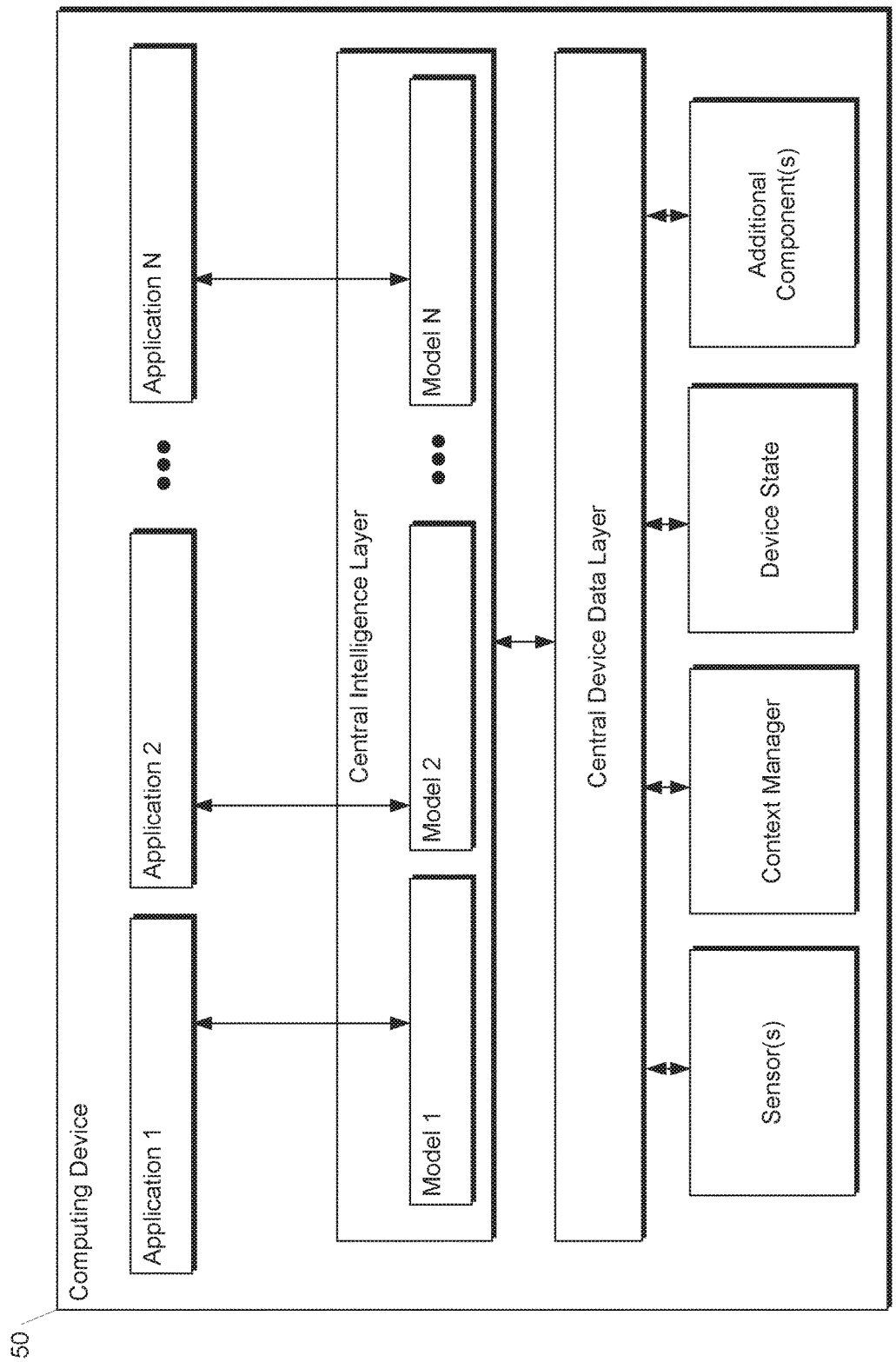
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

5. Example Methods

Figure 2:
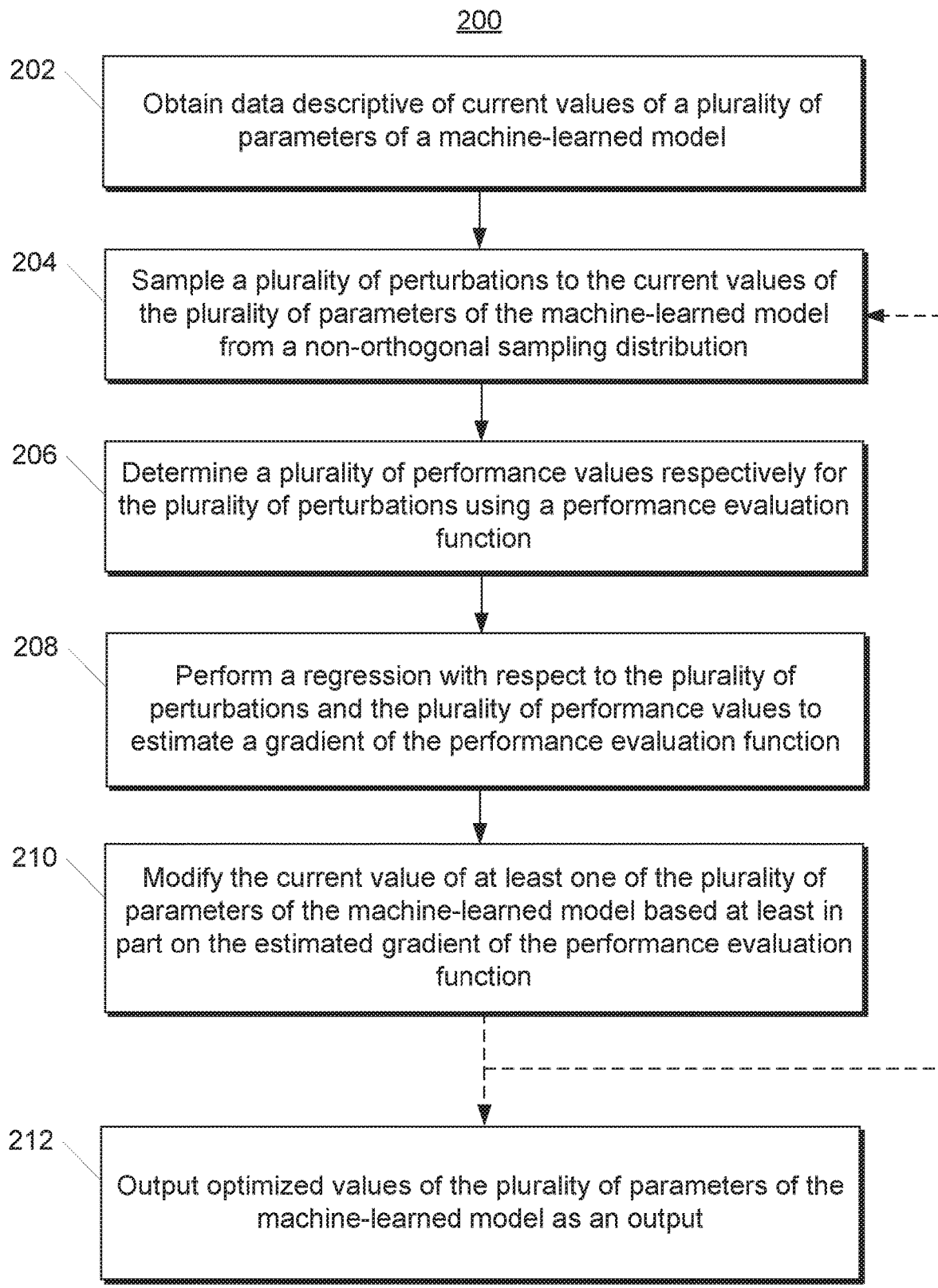
FIG. 2 depicts a flow chart diagram of an example method to perform blackbox optimization according to example embodiments of the present disclosure.

FIG. 2 depicts a flow chart diagram of an example method 200 to perform blackbox optimization according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, parallelized, and/or adapted in various ways without deviating from the scope of the present disclosure.

At 202, a computing system can obtain data descriptive of current values of a plurality of parameters of a machine-learned model.

At 204, the computing system can sample a plurality of perturbations to the current values of the plurality of parameters of the machine-learned model from a non-orthogonal sampling distribution.

At 206, the computing system determine a plurality of performance values respectively for the plurality of perturbations using a performance evaluation function. In one example, the machine-learned model can include a reinforcement learning policy and the performance evaluation function can be a reward function that determines a reward for actions taken in accordance with the reinforcement learning policy. In another example, the machine-learned model can include a neural network and, for example, the performance evaluation function can be a loss function. As examples, the parameters can be weights of the machine-learned model (e.g., internal parameters of neurons of a neural network) or can be hyperparameters of the machine-learned model (e.g., number of layers, number of nodes in each layer, types of connections, types of neurons, etc.). As yet another example, the machine-learned model can be a structured network with weight sharing mechanisms.

At 208, the computing system can perform a regression with respect to the plurality of perturbations and the plurality of performance values to estimate a gradient of the performance evaluation function. As one example, performing the regression can include determining a forward finite-difference estimator based on the plurality of perturbations and the plurality of performance values. As another example, performing the regression can include determining an antithetic estimator based on the plurality of perturbations and the plurality of performance values. As another example, performing the regression can include performing an underconstrained linear regression with respect to the plurality of perturbations and the plurality of performance values. As another example, performing the regression can include performing an L1- or L2-regularized regression with respect to the plurality of perturbations and the plurality of performance values.

At 210, the computing system can modify the current value of at least one of the plurality of parameters of the machine-learned model based at least in part on the estimated gradient of the performance evaluation function.

After 210, the computing system can determine whether additional iterations should be performed. For example, additional iterations can be performed until one or more stopping criteria are met. The stopping criteria can be any number of different criteria including, as examples, a loop counter reaching a predefined maximum, an iteration over iteration change in parameter adjustments falling below a threshold, the estimated gradient being below a threshold value, and/or various other criteria.

If it is determined that an additional iteration should be performed, then method 200 returns to 204 and again samples perturbations. However, if it is determined that an additional iteration should not be performed, then method 200 proceeds to 212.

At 212, the computing system can output final, optimized values of the plurality of parameters of the machine-learned model as an output.

Figure 3:
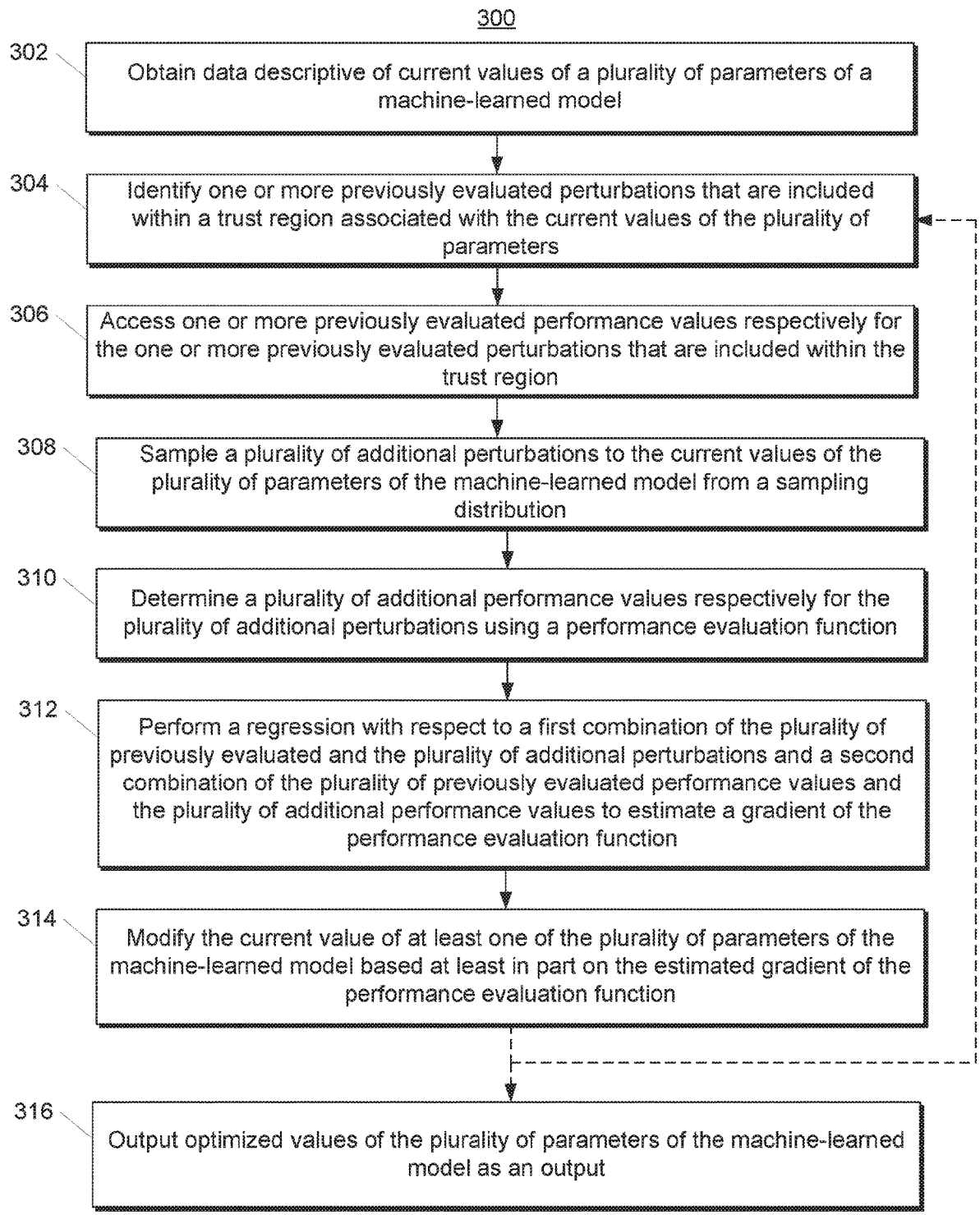
FIG. 3 depicts a flow chart diagram of an example method to perform blackbox optimization according to example embodiments of the present disclosure.

FIG. 3 depicts a flow chart diagram of an example method 300 to perform blackbox optimization according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, parallelized, and/or adapted in various ways without deviating from the scope of the present disclosure.

At 302, a computing system can obtain data descriptive of current values of a plurality of parameters of a machine-learned model.

At 304, the computing system can identify one or more previously evaluated perturbations that are included within a trust region associated with the current values of the plurality of parameters. As one example, identifying the one or more previously evaluated perturbations that are included within the trust region can include identifying any previously evaluated perturbations that are within a radius from the current values of the plurality of parameters. As another example, identifying the one or more previously evaluated perturbations that are included within the trust region can include identifying a fixed fraction of previously evaluated perturbations that are closest to the current values of the plurality of parameters.

At 306, the computing system can access one or more previously evaluated performance values respectively for the one or more previously evaluated perturbations that are included within the trust region.

At 308, the computing system can sample a plurality of additional perturbations to the current values of the plurality of parameters of the machine-learned model from a sampling distribution. The sampling distribution can be orthogonal or non-orthogonal.

At 310, the computing system can determine a plurality of additional performance values respectively for the plurality of additional perturbations using a performance evaluation function. In one example, the machine-learned model can include a reinforcement learning policy and the performance evaluation function can be a reward function that determines a reward for actions taken in accordance with the reinforcement learning policy. In another example, the machine-learned model can include a neural network and, for example, the performance evaluation function can be a loss function. As examples, the parameters can be weights of the machine-learned model (e.g., internal parameters of neurons of a neural network) or can be hyperparameters of the machine-learned model (e.g., number of layers, number of nodes in each layer, types of connections, types of neurons, etc.). As yet another example, the machine-learned model can be a structured network with weight sharing mechanisms.

At 312, the computing system can perform a regression with respect to a first combination of the combination of the plurality of previously evaluated perturbations and the plurality of additional perturbations and a second combination of the plurality of previously evaluated performance values and the plurality of additional performance values to estimate a gradient of the performance evaluation function. As one example, performing the regression can include determining a forward finite-difference estimator based on the plurality of perturbations and the plurality of performance values. As another example, performing the regression can include determining an antithetic estimator based on the plurality of perturbations and the plurality of performance values. As another example, performing the regression can include performing an under-constrained linear regression with respect to the plurality of perturbations and the plurality of performance values. As another example, performing the regression can include performing an L1- or L2-regularized regression with respect to the plurality of perturbations and the plurality of performance values.

At 314, the computing system can modify the current value of at least one of the plurality of parameters of the machine-learned model based at least in part on the estimated gradient of the performance evaluation function.

After 314, the computing system can determine whether additional iterations should be performed. For example, additional iterations can be performed until one or more stopping criteria are met. The stopping criteria can be any number of different criteria including, as examples, a loop counter reaching a predefined maximum, an iteration over iteration change in parameter adjustments falling below a threshold, the estimated gradient being below a threshold value, and/or various other criteria.

If it is determined that an additional iteration should be performed, then method 300 returns to 304 and again identifies previously evaluated perturbations included in the new trust region. However, if it is determined that an additional iteration should not be performed, then method 300 proceeds to 316.

At 316, the computing system can output final, optimized values of the plurality of parameters of the machine-learned model as an output.

6. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
obtaining, by one or more computing devices, data descriptive of current values of a plurality of parameters of a machine-learned model; and
for at least one of one or more iterations:
identifying, by the one or more computing devices, one or more previously evaluated perturbations based at least in part on the current values of the plurality of parameters of the machine-learned model;
sampling, by the one or more computing devices, a plurality of perturbations to the current values of the plurality of parameters of the machine-learned model from a non-orthogonal sampling distribution, the plurality of perturbations including the one or more previously evaluated perturbations;
determining, by the one or more computing devices, a plurality of performance values respectively for the plurality of perturbations, wherein the performance value for each perturbation is generated through evaluation, by a performance evaluation function, of a performance of the machine-learned model with the current values of its parameters perturbed according to the perturbation, wherein determining the plurality of performance values comprises re-using one or more previously evaluated performance values respectively for the one or more previously evaluated perturbations;
performing, by the one or more computing devices, a regression with respect to the plurality of perturbations and the plurality of performance values to estimate a gradient of the performance evaluation function; and
modifying, by the one or more computing devices, the current value of at least one of the plurality of parameters of the machine-learned model based at least in part on the estimated gradient of the performance evaluation function; and
after the one or more iterations, providing, by the one or more computing devices, final values of the plurality of parameters of the machine-learned model as an output,
wherein the one or more previously evaluated perturbations are included within a trust region associated with the current values of the plurality of parameters, and
wherein identifying, by the one or more computing devices, the one or more previously evaluated perturbations that are included within the trust region comprises identifying, by the one or more computing devices, any previously evaluated perturbations that are within a radius from the current values of the plurality of parameters.

2. The computer-implemented method of claim 1, wherein identifying, by the one or more computing devices, the one or more previously evaluated perturbations that are included within the trust region comprises identifying, by the one or more computing devices, a fixed fraction of previously evaluated perturbations that are closest to the current values of the plurality of parameters.

3. The computer-implemented method of claim 1, wherein performing, by the one or more computing devices, the regression with respect to the plurality of perturbations and the plurality of performance values comprises determining, by the one or more computing devices, a forward finite-difference evolution strategy estimator based on the plurality of perturbations and the plurality of performance values.

4. The computer-implemented method of claim 1, wherein performing, by the one or more computing devices, the regression with respect to the plurality of perturbations and the plurality of performance values comprises determining, by the one or more computing devices, an antithetic evolution strategy estimator based on the plurality of perturbations and the plurality of performance values.

5. The computer-implemented method of claim 1, wherein the machine-learned model comprises a reinforcement learning policy and the performance evaluation function comprises a reward function that determines a reward for actions taken in accordance with the reinforcement learning policy.

6. The computer-implemented method of claim 1, wherein the machine-learned model comprises a neural network.

7. The computer-implemented method of claim 1, wherein the parameters of the machine-learned model comprise hyperparameters of the machine-learned model.

8. The computer-implemented method of claim 1, wherein the machine-learned model comprises a structured network with weight sharing mechanisms.

9. The computer-implemented method of claim 1, wherein performing, by the one or more computing devices, the regression with respect to the plurality of perturbations and the plurality of performance values comprises performing, by the one or more computing devices, an under-constrained linear regression with respect to the plurality of perturbations and the plurality of performance values.

10. The computer-implemented method of claim 1, wherein performing, by the one or more computing devices, the regression with respect to the plurality of perturbations and the plurality of performance values comprises performing, by the one or more computing devices, an L1- or L2-regularized regression with respect to the plurality of perturbations and the plurality of performance values.

11. A computing system, comprising:
one or more processors; and
one or more non-transitory computer-readable media that collectively store instructions that, when executed by the one or more processors, cause the computing system to perform operations, the operations comprising:
obtaining data descriptive of current values of a plurality of parameters of a machine-learned model; and
for at least one iteration of one or more iterations:
identifying one or more previously evaluated perturbations that are included within a trust region associated with the current values of the plurality of parameters;
accessing one or more previously evaluated performance values respectively for the one or more previously evaluated perturbations that are included within the trust region;
sampling a plurality of additional perturbations to the current values of the plurality of parameters of the machine-learned model from a sampling distribution;
determining a plurality of additional performance values respectively for the plurality of additional perturbations, wherein the performance value for each additional perturbation is generated through evaluation, by a performance evaluation function, of a performance of the machine-learned model with the current values of its parameters perturbed according to the additional perturbation;
performing a regression with respect to a first combination of the one or more previously evaluated perturbations with the plurality of additional perturbations and a second combination of the one or more previously evaluated performance values with the plurality of additional performance values to estimate a gradient of the performance evaluation function; and
modifying the current value of at least one of the plurality of parameters of the machine-learned model based at least in part on the estimated gradient of the performance evaluation function,
wherein identifying the one or more previously evaluated perturbations that are included within the trust region comprises identifying a fixed fraction of previously evaluated perturbations that are closest to the current values of the plurality of parameters.

12. The computing system of claim 11, wherein identifying the one or more previously evaluated perturbations that are included within the trust region comprises identifying any previously evaluated perturbations that are within a radius from the current values of the plurality of parameters.

13. The computing system of claim 11, wherein performing the regression comprises determining a forward finite-difference evolution strategy estimator based on the first combination of the one or more previously evaluated perturbations with the plurality of additional perturbations and the second combination of the one or more previously evaluated performance values with the plurality of additional performance values.

14. The computing system of claim 11, wherein performing the regression comprises determining an antithetic evolution strategy estimator based on the first combination of the one or more previously evaluated perturbations with the plurality of additional perturbations and the second combination of the one or more previously evaluated performance values with the plurality of additional performance values.

15. One or more non-transitory computer-readable media that collectively store operations that when executed by a computing system cause the computing system to perform operations, the operations comprising:
obtaining data descriptive of current values of a plurality of parameters of a machine-learned model; and
for at least one of one or more iterations:
identifying, by the one or more computing devices, one or more previously evaluated perturbations based at least in part on the current values of the plurality of parameters of the machine-learned model;
sampling a plurality of perturbations to the current values of the plurality of parameters of the machine-learned model from a non-orthogonal sampling distribution, the plurality of perturbations including the one or more previously evaluated perturbations;
determining a plurality of performance values respectively for the plurality of perturbations, wherein the performance value for each perturbation is generated through evaluation, by a performance evaluation function, of a performance of the machine-learned model with the current values of its parameters perturbed according to the perturbation, wherein determining the plurality of performance values comprises re-using one or more previously evaluated performance values respectively for the one or more previously evaluated perturbations;

performing a regression with respect to the plurality of perturbations and the plurality of performance values to estimate a gradient of the performance evaluation function; and modifying the current value of at least one of the plurality of parameters of the machine-learned model based at least in part on the estimated gradient of the performance evaluation function; and after the one or more iterations, providing final values of the plurality of parameters of the machine-learned model as an output, wherein the one or more previously evaluated perturbations are included within a trust region associated with the current values of the plurality of parameters, and wherein identifying the one or more previously evaluated perturbations that are included within the trust region comprises identifying any previously evaluated perturbations that are within a radius from the current values of the plurality of parameters.

16. The one or more non-transitory computer-readable media of claim 15, wherein identifying the one or more previously evaluated perturbations that are included within the trust region comprises identifying a fixed fraction of previously evaluated perturbations that are closest to the current values of the plurality of parameters.

17. The one or more non-transitory computer-readable media of claim 15, wherein performing the regression with respect to the plurality of perturbations and the plurality of performance values comprises determining a forward finite-difference evolution strategy estimator based on the plurality of perturbations and the plurality of performance values.

18. The one or more non-transitory computer-readable media of claim 15, plurality of perturbations and the plurality of performance values comprises determining an antithetic evolution strategy estimator based on the plurality of perturbations and the plurality of performance values.

19. The one or more non-transitory computer-readable media of claim 15, wherein the machine-learned model comprises a reinforcement learning policy and the performance evaluation function comprises a reward function that determines a reward for actions taken in accordance with the reinforcement learning policy.

20. The one or more non-transitory computer-readable media of claim 15, wherein the machine-learned model comprises a neural network.

* * * * *